United States Patent
Schlipf et al.

(10) Patent No.: US 11,731,755 B2
(45) Date of Patent: Aug. 22, 2023

(54) LINEAR DRIVE DEVICE FOR AN AIRCRAFT, A DRIVE ARRANGEMENT AND AN AIRCRAFT HAVING SUCH A LINEAR DRIVE DEVICE

(71) Applicant: Airbus Operations GmbH, Hamburg (DE)

(72) Inventors: Bernhard Schlipf, Bremen (DE); Florian Lorenz, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/580,765

(22) Filed: Jan. 21, 2022

(65) Prior Publication Data

US 2022/0234724 A1     Jul. 28, 2022

(30) Foreign Application Priority Data

Jan. 25, 2021   (DE) .......................... 102021101487.5

(51) Int. Cl.
*B64C 13/32*   (2006.01)
*B64C 13/34*   (2006.01)

(52) U.S. Cl.
CPC .............. *B64C 13/32* (2013.01); *B64C 13/34* (2013.01)

(58) Field of Classification Search
CPC .................................. B64C 13/32; B64C 13/34
See application file for complete search history.

(56) References Cited

U.S. PATENT DOCUMENTS

| | | | | |
|---|---|---|---|---|
| 8,656,809 B2 * | 2/2014 | Bayer | .................... | F16H 49/001 |
| | | | | 475/167 |
| 8,881,615 B2 * | 11/2014 | Schreiber | ................ | F16H 19/04 |
| | | | | 74/424.94 |

FOREIGN PATENT DOCUMENTS

| | | | | | |
|---|---|---|---|---|---|
| DE | 3136552 A | * | 3/1983 | ........... | F16H 49/001 |
| DE | 3136552 A1 | | 3/1983 | | |
| DE | 102006042786 A1 | * | 3/2008 | ............. | F16H 25/06 |
| DE | 102006042786 A1 | | 3/2008 | | |
| DE | 102011051514 A1 | * | 1/2013 | ............. | F16H 19/04 |
| DE | 102011051514 A1 | | 1/2013 | | |
| DE | 102012102802 A1 | * | 10/2013 | ............. | F16H 25/02 |
| DE | 102016204133 A1 | * | 9/2017 | .......... | F16H 25/205 |
| DE | 102016204133 A1 | | 9/2017 | | |
| DE | 102019129662 A1 | * | 5/2021 | | |
| EP | 2541098 A1 | * | 1/2013 | ............. | F16H 19/04 |
| EP | 3748195 A1 | * | 12/2020 | ............. | B60N 2/067 |
| EP | 3748195 A1 | | 12/2020 | | |

OTHER PUBLICATIONS

German Search Report; priority document.

* cited by examiner

*Primary Examiner* — Justin M Benedik
(74) *Attorney, Agent, or Firm* — Greer, Burns & Crain, Ltd.

(57) ABSTRACT

In order to improve linear drives on aircraft with regards to backlash, gear reduction, self-lock capability, load transfer and wear, a linear drive device is provided that has a first member with engaging teeth, such as a tooth rack and a second member which functions as a drive unit. The second member includes a plurality of movable teeth that are actuated by a cam shaft. The cam shaft has a control cam portion that is shaped such that the movable teeth perform a wave-like motion that forces the first member along its longitudinal direction relative to the second member.

18 Claims, 11 Drawing Sheets

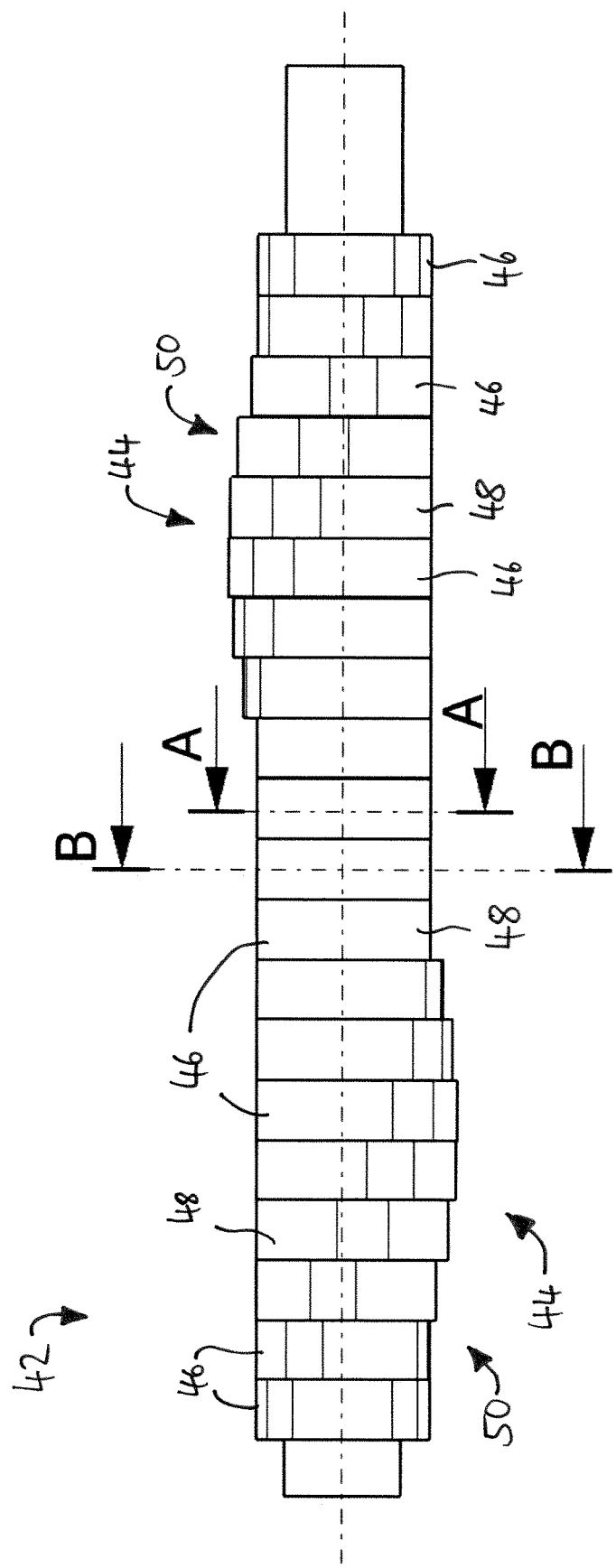

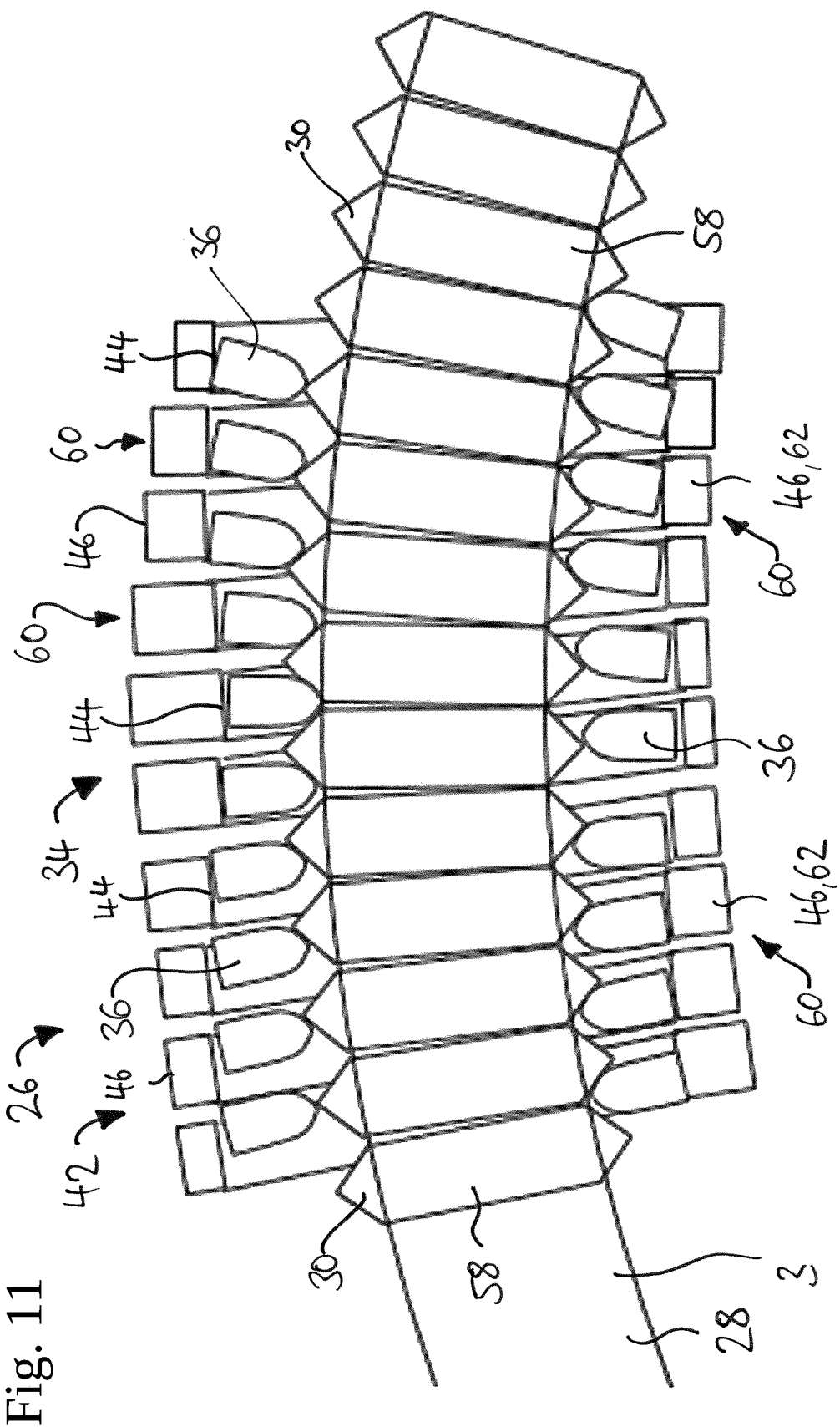

LINEAR DRIVE DEVICE FOR AN AIRCRAFT, A DRIVE ARRANGEMENT AND AN AIRCRAFT HAVING SUCH A LINEAR DRIVE DEVICE

CROSS-REFERENCES TO RELATED APPLICATIONS

This application claims the benefit of the German patent application No. 102021101487.5 filed on Jan. 25, 2021, the entire disclosures of which are incorporated herein by way of reference.

FIELD OF THE INVENTION

The invention relates to a linear drive device for driving a movable component of an aircraft, such as a high-lift device. The invention further relates to a drive arrangement, a wing and an aircraft.

BACKGROUND OF THE INVENTION

In aviation, numerous different linear geared drives are used to actuate or drive external and internal components of an aircraft. Those components include high-lift devices, intake ducts and their covers, control surfaces, loading ramps, cargo transporters, cargo locks and door latches as well as passenger seats.

Desirable properties for these drives include zero backlash, large gear reduction from the input to the output, ability to self-lock, better load transfer and reduced wear.

SUMMARY OF THE INVENTION

It is an object of the invention to provide an improved linear drive device exhibiting at least one of these desired properties.

The invention provides a linear drive device for a movable component of an aircraft, comprising a first member, the first member extending in a longitudinal direction and having a plurality of engaging teeth, and a second member configured to be movable relative to the first member in the longitudinal direction, the second member including:

a plurality of engaging members being supported so as to be movable between a fully extended position, in which the respective engaging member fully engages a pair of engaging teeth, and a fully retracted position, in which the respective engaging member is disengaged from the first member such that the engaging member is movable along the longitudinal direction without encountering an engaging tooth;

a rotatable cam shaft having a control cam portion, the cam portion being configured so as to, upon rotation of the cam shaft, sequentially shift the engaging members thereby causing a linear motion of the movable member relative to the first member along the longitudinal direction.

Preferably, the engaging members are configured in a linear arrangement that is aligned parallel to the longitudinal direction. Preferably, the engaging members are configured in a circular arrangement around the first member.

Preferably, at least one engaging member is integrally formed with a membrane member, the membrane member being deformable by the control cam portion so that the engaging members are shiftable between the fully retracted and fully engaged positions.

Preferably, at least one engaging member has an engaging portion that is arranged to contact the first member, and the engaging portion engages the first member in a planar manner.

Preferably, the engaging portion, when viewed in a cross-section, is shaped as a triangle or an ogive.

Preferably, at least one engaging member has a cam contact portion that is arranged opposite of the engaging portion and arranged to contact the cam portion.

Preferably, at least one engaging member is formed as a rectangular solid member or as a pin-like member; or wherein at least one engaging member is formed as a circular arc shaped solid member.

Preferably, the second member supports the cam shaft and/or the engaging members.

Preferably, the second member comprises a support member having a plurality of openings, and the engaging members are arranged in the openings so as to be slidable between the fully extended and fully retracted positions.

Preferably, the cam shaft is configured as a massive shaft and the cam portion is disposed on the outer circumferential surface of the cam shaft. Preferably, the cam shaft is configured as a hollow shaft and the cam portion is disposed on the inner circumferential surface of the cam shaft.

Preferably, the cam shaft comprises a plurality of cam segments and each cam segment includes a different section of the cam portion.

Preferably, the cam segments are rotationally offset in a progressive manner along the axial direction of the cam shaft, so as to generate a wave-like motion of the engaging members along the longitudinal direction.

Preferably, the cam shaft is configured as an articulated shaft and each cam segment forms an articulated portion of the articulated shaft.

Preferably, the first member is configured in a circular arc shape.

The invention provides a drive arrangement for a wing of an aircraft comprising a high-lift device and/or a control surface, and a linear drive device according to any the preceding claims, wherein the linear drive is configured for driving the high-lift device and/or the control surface between a fully retracted and a fully extended position, wherein the first member is attached to the high-lift device and/or control surface and the second member is attachable to the wing.

The invention provides a wing for an aircraft comprising such a drive arrangement.

The invention provides an aircraft comprising a linear drive device, a drive arrangement or a wing as described herein, respectively.

The proposed linear drive has a cam shaft on the input/drive side, which is driven by some kind of power unit, e.g., an electric or hydraulic motor. The cam shaft is preferably seated in a housing and supported by bearing assemblies. The cam on the shaft is continuously located along the whole shaft in a spherical arrangement. Between the cam shaft and the rack multiple teeth are located in openings inside the housing. The teeth are movable relative to the housing.

A certain number of these teeth are pressed towards the rack by the cam. Based on the rotational position of the cam shaft, different teeth are pressed down and the downwards movement of the tooth can be described by a wave. In that way the down pressed teeth drive the rack along its longitudinal axis. The minimum transmission speed from drive side to linear drive is at least one tooth of the rack per cam shaft rotation. Different transmission ratios are possible when multiple cam segments with offset phases are used. To drive the rack, the drive side (preferably including the housing) and the cam shaft are preferably rigidly mounted in relation to the rack in its drive direction.

It is also possible that the proposed device has an inverted cam shaft build as a hollow shaft with an internal cam that is used to press down multiple teeth. The teeth are mounted in a housing surrounding the piston. The piston is built like a rack with gear teeth. These teeth are continuously formed around the piston main axis. The internal cam geometry in the cam hollow shaft is preferably designed in a spiral form. The movement of the teeth towards the piston build a wave. In that way, always a certain number of teeth are engaged and the piston is transported by the teeth in its drive direction. The cam shaft is, in its main axis direction, rigidly connected to the housing and driven by some kind of external powered device.

The piston may also be a curved piston. The cam shaft in this case must consist of many segments correlating to the tooth positions. The segments must be coupled rotational to rotate synchronously.

While the linear drive device is subsequently described with reference to high-lift devices for the sake of brevity, it should be noted that the linear drive device may also be configured to drive other external movable components or internal movable components of an aircraft. External movable components include high-lift devices, intake ducts and their covers and control surfaces, whereas internal movable components include loading ramps, cargo transporters, cargo locks and door latches, as well as passenger seats.

BRIEF DESCRIPTION OF THE DRAWINGS

Examples of the invention are subsequently described in more detail with reference to the accompanying drawings. Therein:

FIG. 5 depicts a side view of the cam shaft of FIG. 4;
FIG. 11 depicts a variant of the linear drive device of FIG. 9.

DETAILED DESCRIPTION OF THE PREFERRED EMBODIMENTS

Figure 1:
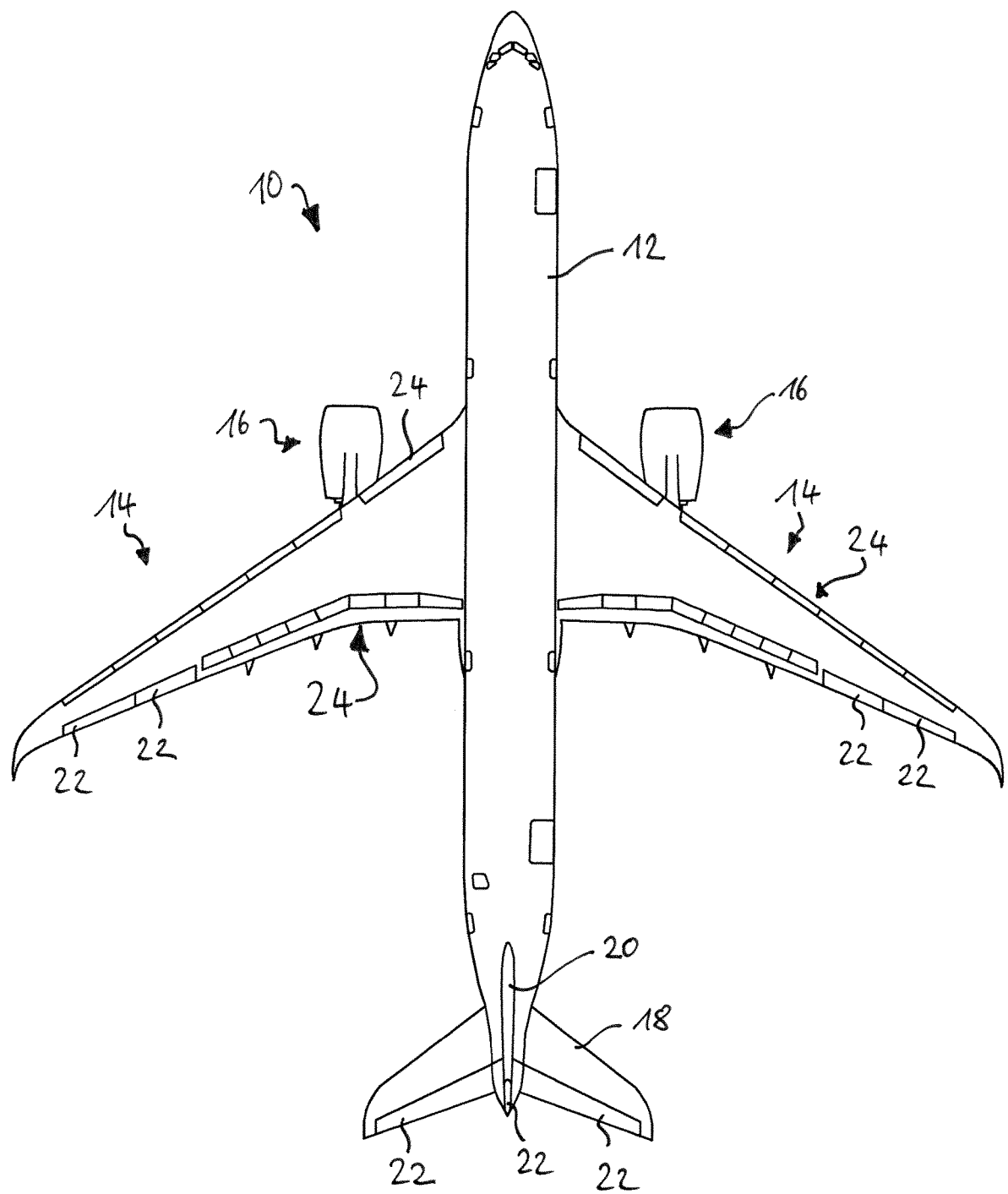
FIG. 1 depicts an embodiment of an aircraft.

Referring to FIG. 1, an exemplary embodiment of an aircraft 10 comprises a fuselage 12 to which a pair of wings 14 is attached. Further attached to the wings 14 is a pair of turbine engines 16. It should be noted that the number and type of engines may vary. At the rear of the fuselage 12 a horizontal tail plane (HTP) 18 and a vertical tail plane (VTP) 20 are arranged.

The wings 14, the HTP 18 and the VTP 20 have a plurality of control surfaces 22 for steering the aircraft 10. In addition, the wings 14 also contain a plurality of high-lift devices 24, such as slats and flaps.

Figure 2:
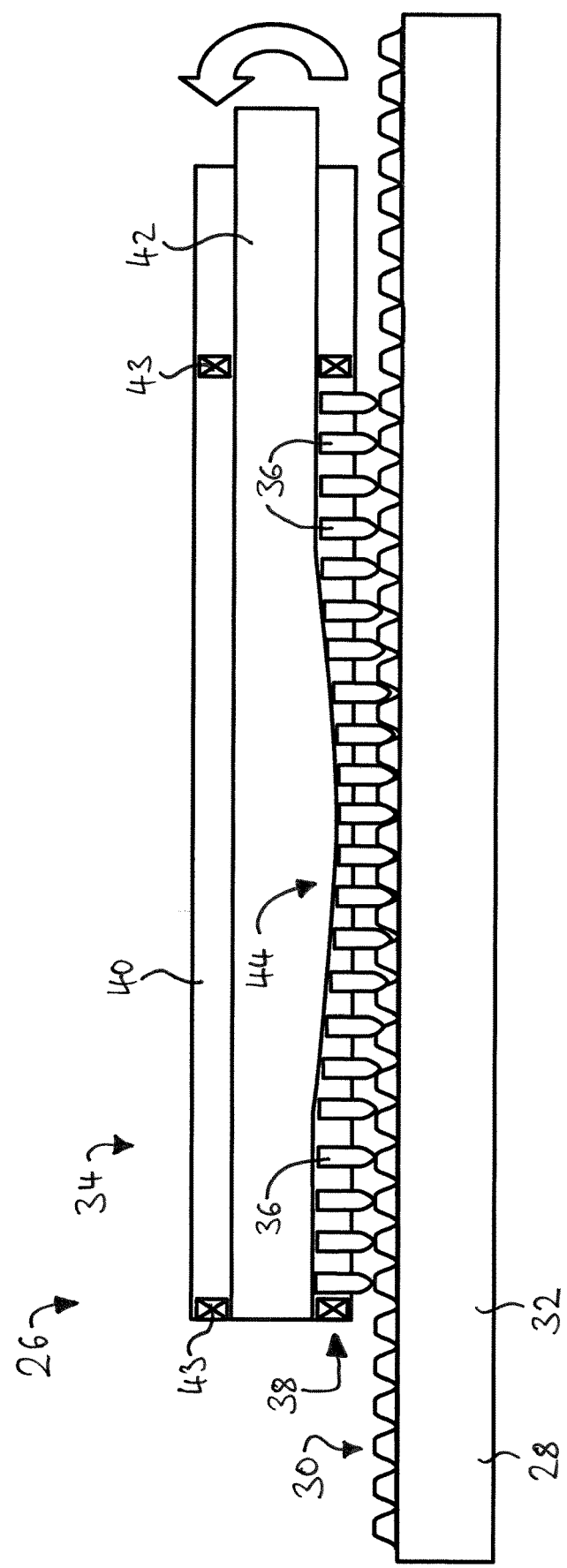
FIG. 2 depicts a first embodiment of a linear drive device.

Referring to FIG. 2, the high-lift device 24 is driven between a retracted and an extended position by a linear drive device 26.

The linear drive device 26 comprises a first member 28 that extends in a longitudinal direction. The first member 28 has a plurality of engaging teeth 30. The first member 28 can be a toothed rack 32. The first member 28 is coupled to the high-lift device 24.

The linear drive device 26 comprises a second member 34. The second member 34 can be moved relative to the first member 28 along the longitudinal direction. The second member 34 is coupled to the wing 14.

The second member 34 has a plurality of engaging members 36. The engaging members 36 can be shifted between a fully extended position and a fully retracted position. In the fully extended position, the engaging members 36 mesh with the engaging teeth 30, whereas in the fully retracted position the engaging members 36 are able to pass the engaging teeth 30 along the longitudinal direction.

The second member 34 includes a support member 38. The support member 38 is configured to individually support the engaging members 36. In the present example, the support member 38 is formed by a housing 40.

The second member 34 comprises a cam shaft 42. The cam shaft 42 is supported in a rotating manner, preferably by the housing 40. The second member 34 may include one or more bearings 43 for supporting the cam shaft 42.

The cam shaft 42 has a control cam portion 44. The control cam portion 44 sequentially engages with the engaging members 36 upon rotation of the cam shaft 42. As indicated in FIG. 2, upon rotation of the cam shaft 42 in a clockwise direction, the control cam portion 44 engages with the engaging members 36 in sequence from right to left, thereby pushing the engaging members 36 into the fully extended position.

The engaging members 36 extend and retract in a wavelike pattern and as a result force the first member 28 along its longitudinal direction, for example to the left.

Figure 3:
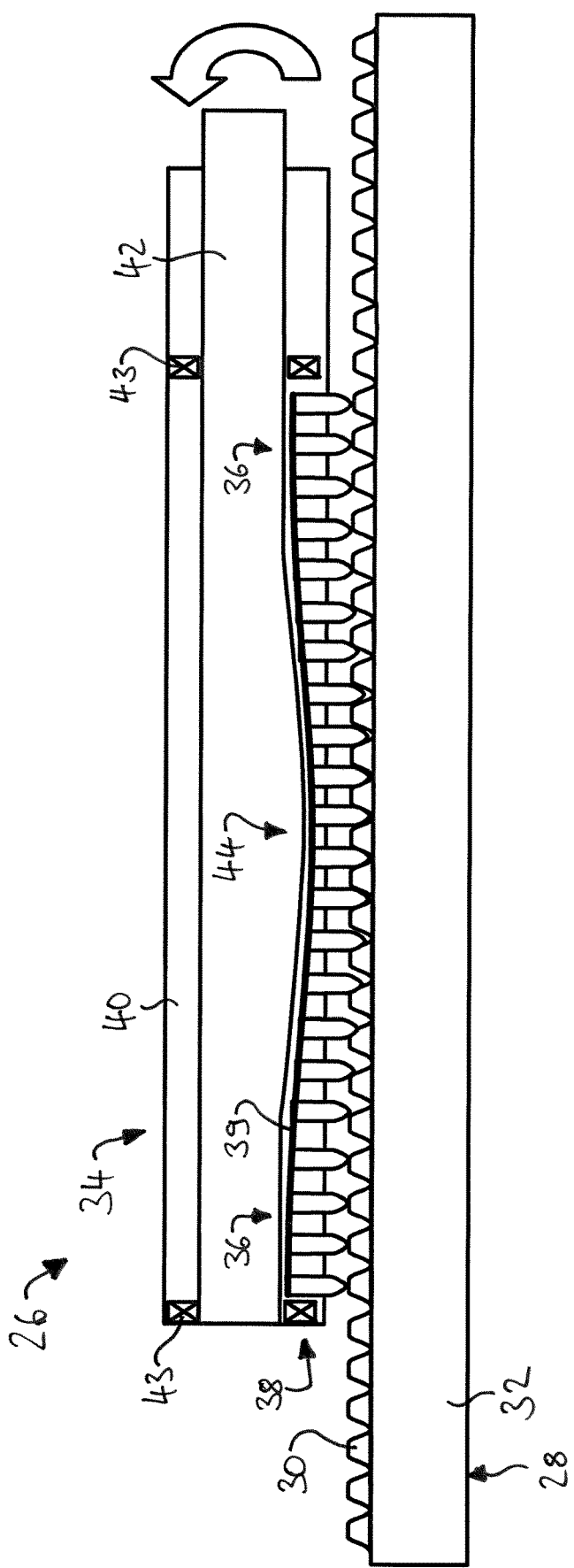
FIG. 3 depicts a variant of the linear drive device of FIG. 2.
Figure 4:
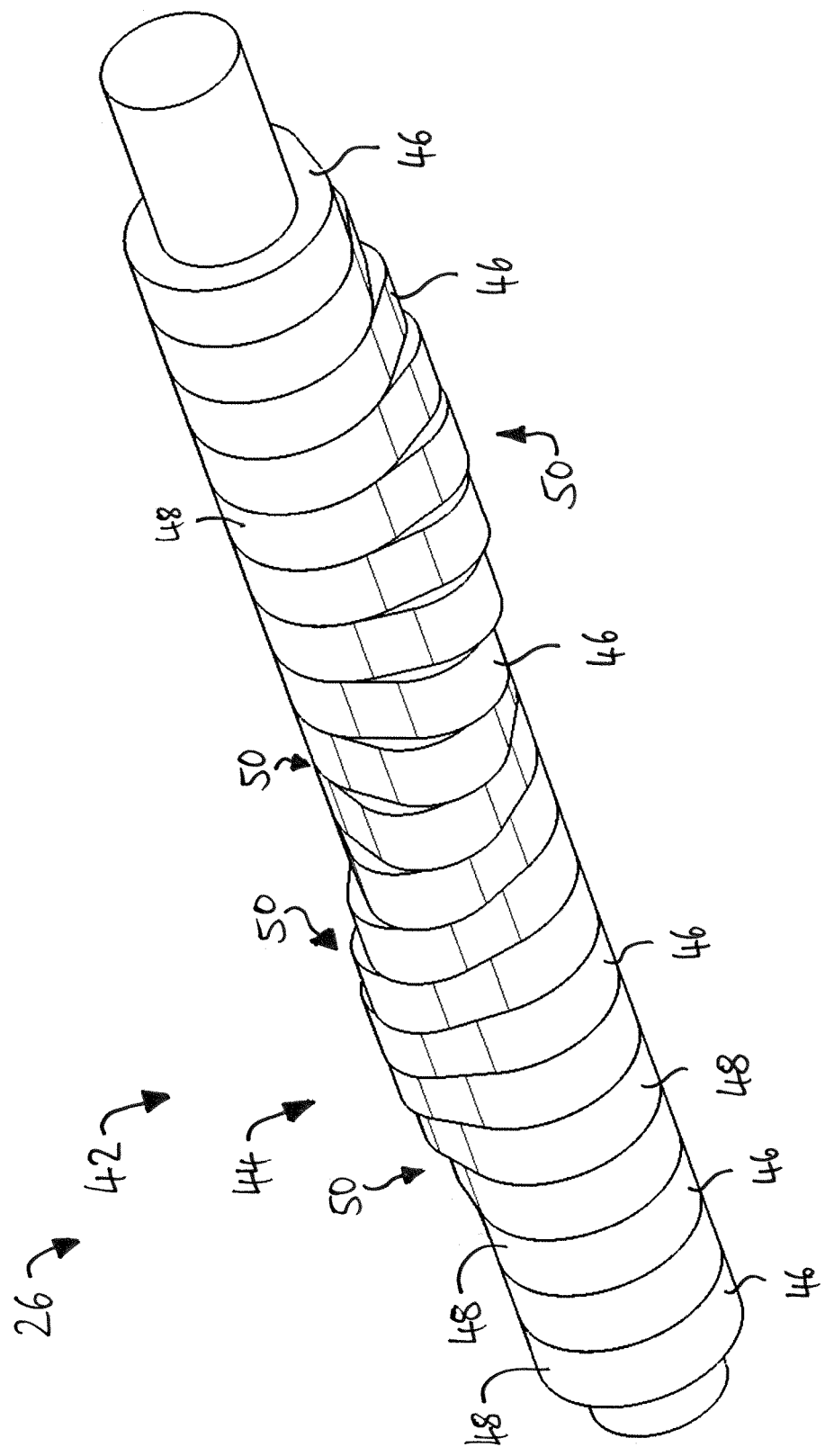
FIG. 4 depicts an isometric view of a cam shaft in more detail.

Referring to FIG. 3, a variant of the linear drive device 26 is described only insofar as it differs from the embodiment of FIG. 2. In this variant, the engaging members 36 are formed on a flexible sheet member 39. The flexible sheet member 39 can be a metal sheet, for example. The flexible sheet member 39 is flexible in the sense that the flexible sheet member 39 is reversibly deformed upon rotation of the cam shaft 42 by the control cam portion 44, so that as a result the engaging members 36 are moved between the fully extended and fully retracted position. The flexible sheet member 39 can perform the function of a leaf spring such that the pushing of the engaging members 36 is caused by the control cam portion 44, whereas the retraction is caused by the elastic tension of the flexible sheet member 39.

Referring to FIG. 4 to FIG. 8, the configuration and function of the cam shaft 42 are described in more detail.

The control cam portion 44 comprises a plurality of cam segments 46. Each cam segment 46 has a circular portion 48. The circular portion 48 makes up the majority of the respective cam segment's 46 circumference. The circular portion 48 has a radius that allows the corresponding engaging member 36 to be moved into its fully retracted position.

Each cam segment 46 includes a control cam 50. The control cam 50 makes up the remainder of the cam segment's 46 circumference. The control cam 50 is configured such that, upon rotation of the cam segment 46, the control cam 50 pushes the respective engaging member 36 from the fully retracted position into the fully extended position.

Figure 6A:
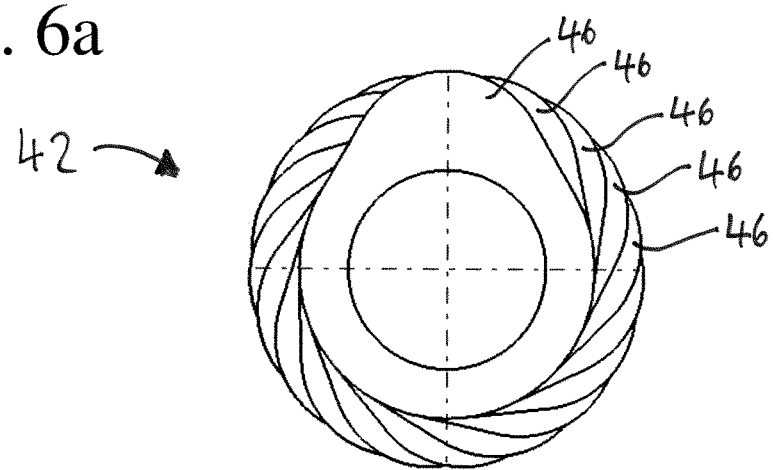
FIG. 6a depicts a front view (top)
Figure 6B:
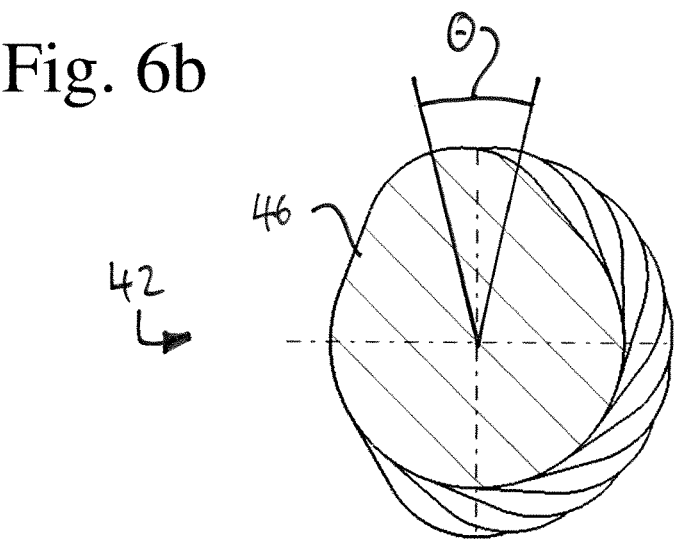
FIG. 6b depicts a cross-section through A-A (middle) and FIG. 6c depicts a cross-section through B-B (bottom) of the cam shaft of FIG. 4.
Figure 6C:
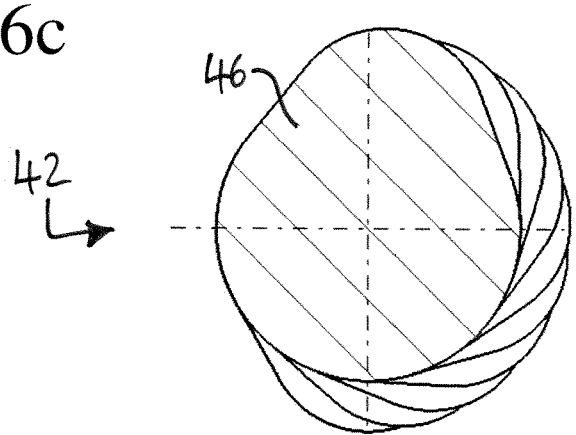

As depicted, in particular in FIG. 4 to FIGS. 6a-6c, the cam segments 46 are arranged on the cam shaft 42 such that neighboring cam segments 46 are offset by a certain offset angle θ. The offset angle θ is preferably measured between the lines through the largest radial extent of the cam segment 46 that cross in the center of the cam shaft 42, as illustrated in FIGS. 6a-6c.

Figure 7:
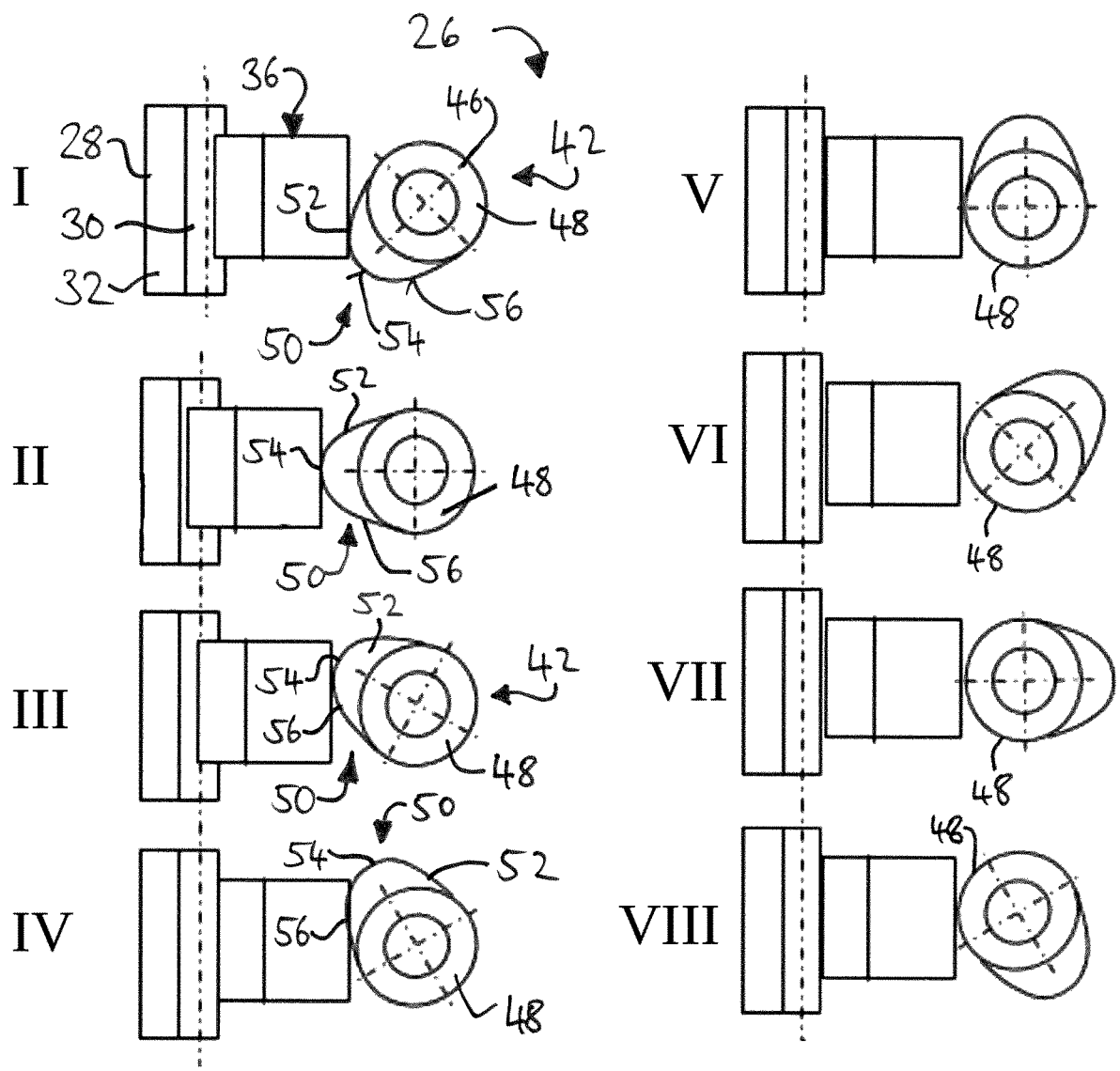
FIG. 7 depicts a sequence of cam shaft positions.
Figure 8:
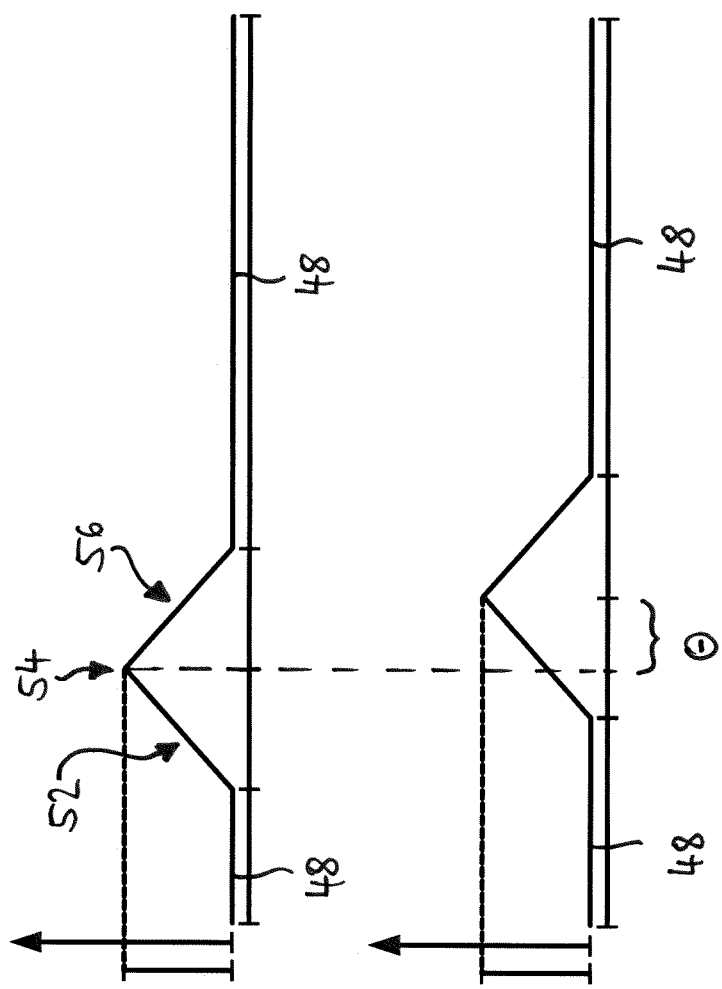
FIG. 8 depicts a stroke-timing diagram for the cam shaft of FIG. 4.

FIG. 7 and FIG. 8 illustrate more closely the action of a single cam segment 46.

Each control cam 50 includes three functional sections. A first functional section 52 is the section that upon rotation of the cam shaft 42 makes initial contact with the engaging member 36 and pushes it. A second functional section 54 is the section which supports the engaging member 36 in the fully extended position for a small part of the rotation of the cam shaft 42. A third functional section 56 is the section that recedes back upon rotation of the cam shaft 42 so that the engaging member 36 may disengage from the engaging teeth 30. Disengaging may be caused by the engaging teeth 30 pushing the engaging member 36 due to the longitudinal movement of the first member 28 or an elastic spring force generated by the flexible sheet member 39.

As shown in FIG. 7, the cam shaft 42 turns clockwise. The first member 28 may move into the drawing layer. If the cam shaft 42 turns counter-clockwise, the motion of the first member 28 is also reversed.

Initially in step I, the cam segment 46 makes contact with the engaging member 36 by means of the first functional section 52. As a result, the engaging member 36 is pushed out of the fully retracted position towards the first member 28 and the driving force is transmitted from the cam shaft 42 to the first member 28.

In step II, the cam segment 46 has moved on so that the second functional section 54 keeps the engaging ember in the fully extended position, in which the engaging member 36 and the engaging teeth 30 are meshing.

In steps III and IV, the cam segment 46 has rotated further and the third functional section 56 is contacting the engaging member 36. Thus, the engaging member 36 is prevented from being fully pushed into the fully retracted position by forces acting on the first member 28. Albeit the third functional section 56 allows the engaging member 36 to recede from full engagement with the engaging teeth 30. As a result, a force acting on the first member 28 may be transmitted via the engaging member 36 to the cam shaft.

In steps V to VIII, the cam segment 46 may contact the engaging member 36 with its circular portion 48. In this configuration, no force is transmitted from the cam shaft 42 to the first member 28.

Taking into account that the steps I to VIII are performed by each individual cam segment 46, the entire linear drive device 26 has no backlash and is self-locking. Furthermore, the offset angle θ influences the reduction ratio. The smaller θ is, the larger is the reduction ratio.

It should be noted that while the control cam portion 44 was previously described as being formed from separate discreet cam segments 46, the size of the cam segments 46 may be chosen so small that for practical purposes the cam segments 46 and the cam portion 44 are continuous or without step-like features between adjacent cam segments 46.

FIG. 8 depicts the stroke of adjacent cam segments 46 over their rotational angle. They are offset by the offset angle θ. The zero stroke or dwell corresponds to the circular portion 48, the rising portion corresponds to the first functional section 52, the upper flat portion at maximum stroke corresponds to the second functional portion 54 and the falling portion corresponds to the third functional section 56.

It should be noted that while the curves in FIG. 8 are depicted having a linear characteristic over the rotational angle, this need not be the case. Depending on various parameters for the drive, other characteristics are possible.

Figure 9:
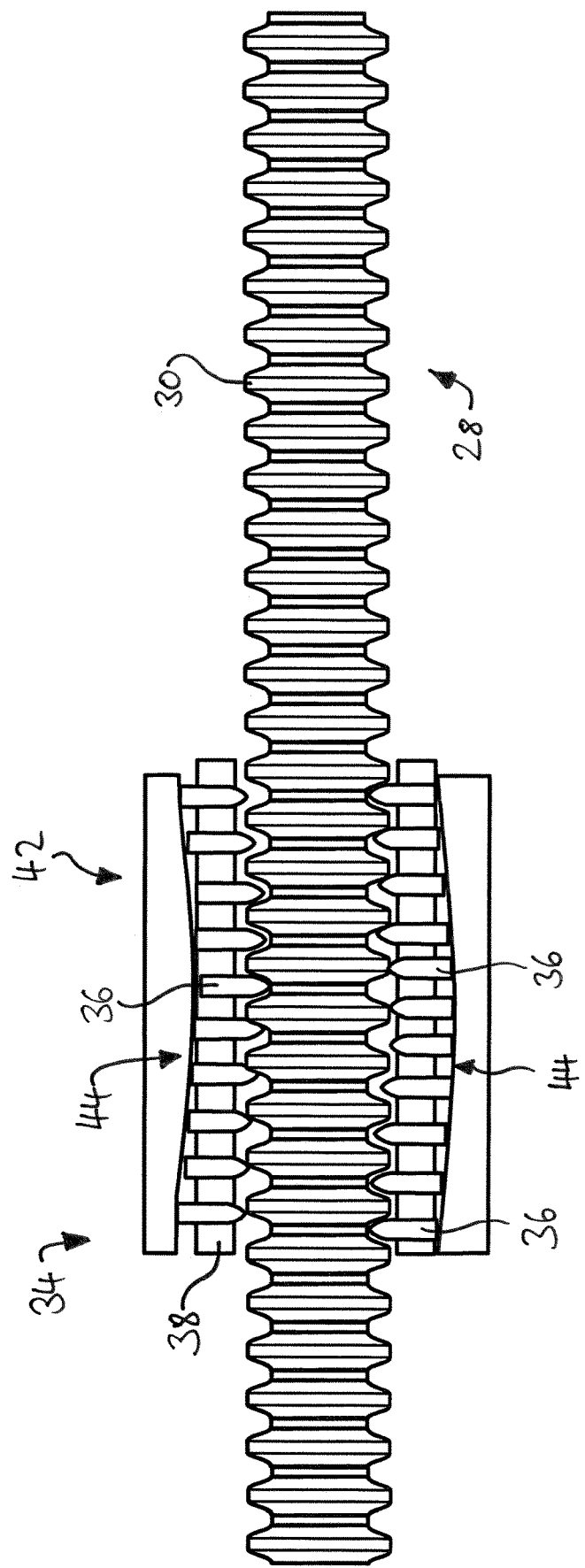
FIG. 9 depicts a second embodiment of the linear drive device.
Figure 10:
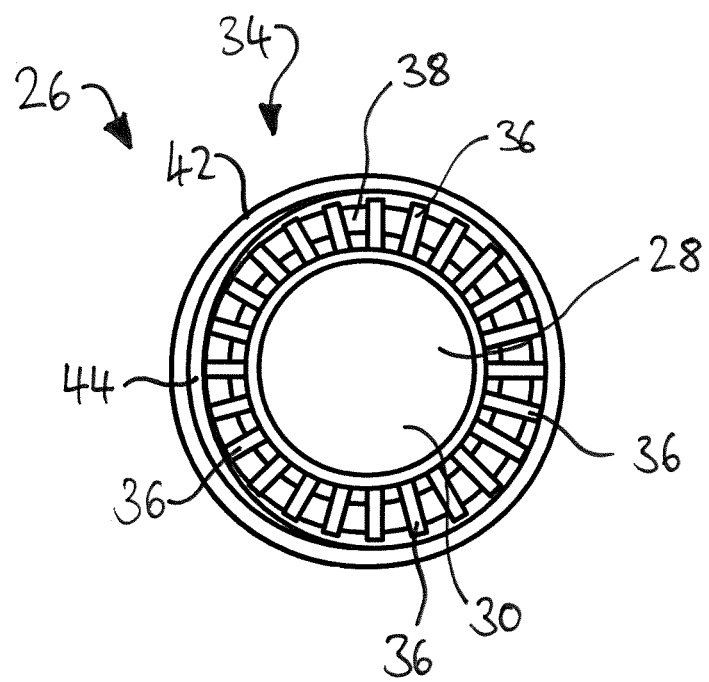
FIG. 10 depicts a front view of the linear drive device of FIG. 9.

Referring to FIG. 9 and FIG. 10, another embodiment of a linear drive device 26 is described insofar as it differs from the previously described embodiment.

The linear drive device 26 comprises a first member 28 that extends in a longitudinal direction. The first member 28 has a plurality of engaging teeth 30. The engaging teeth 30 are configured as circumferential teeth.

The linear drive device 26 comprises a second member 34. The second member 34 can be moved relative to the first member 28 along the longitudinal direction.

The second member 34 has a plurality of engaging members 36. The engaging members 36 are arranged circumferentially and preferably surround the first member 28, as depicted in particular in FIG. 10.

The second member 34 includes a support member 38. The support member 38 is configured to individually support the engaging members 36. In the present example, the support member 38 takes the form of a bushing.

The second member 34 comprises a cam shaft 42. The cam shaft 42 is supported in a rotating manner, preferably by a housing. The housing is omitted in FIG. 9 and FIG. 10 so as to allow view of the mechanism.

The cam shaft 42 is configured as a hollow shaft. The cam shaft 42 has a control cam portion 44 arranged on its inner circumferential surface. The control cam portion 44 functions as previously described with reference to FIG. 4 to FIG. 8.

As a result, the engaging members 36 extend and retract in a wave-like pattern and force the first member 28 along its longitudinal direction, for example to the left.

Referring to FIG. 11, a variant of the linear drive device 26 is described only insofar as it differs from the embodiment of FIG. 9 and FIG. 10.

In this variant, the first member 28 is configured in a circular arc shape.

The engaging teeth 30 are arranged on individual first member segments 58. Similarly, the second member 34 is configured as a plurality of individual second member segments 60.

Each second member segment 60 includes a cam shaft segment 62 of the cam shaft 42, a support member segment of the support member 38 (not depicted for sake of a better view), and part of the engaging members 36. The whole configuration is kept together by means of a housing (again not depicted for better view).

In order to improve linear drives on aircraft with regards to backlash, gear reduction, self-lock capability, load transfer and wear, the invention provides a linear drive device (26) that has a first member (28) with engaging teeth (30), such as a toothed rack (32) and a second member (34) which functions as a drive unit. The second member (34) includes a plurality of movable teeth (36) that are actuated by a cam shaft (42). The cam shaft (42) has a control cam portion (44) that is shaped such that the movable teeth (36) perform a wave-like motion that forces the first member (28) along its longitudinal direction relative to the second member (34).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 wing
16 turbine engine
18 horizontal tail plane (HTP)
20 vertical tail plane (VTP)
22 control surface
24 high-lift device
26 linear drive device
28 first member
30 engaging teeth
32 toothed rack
34 second member
36 engaging members
38 support member
39 flexible sheet member
40 housing
42 cam shaft
43 bearing
44 control cam portion
46 cam segment
48 circular portion
50 control cam
52 first functional section
54 second functional section
56 third functional section
58 first member segment
60 second member segment
62 cam shaft segment
θ offset angle

The invention claimed is:

1. A linear drive device, comprising:
a first member, the first member extending in a longitudinal direction and having a plurality of engaging teeth, and
a second member configured to be movable relative to the first member in the longitudinal direction, the second member including:
a plurality of engaging members being supported so as to be movable between a fully extended position, in which a respective engaging member fully engages a pair of engaging teeth, and a fully retracted position, in which the respective engaging member is disengaged from the first member such that the engaging member is movable along the longitudinal direction without encountering an engaging tooth; and
a rotatable cam shaft having a control cam portion, the control cam portion being configured so as to, upon rotation of the cam shaft, sequentially shift the engaging members thereby causing a linear motion of the second member relative to the first member along the longitudinal direction,
wherein the cam shaft comprises a plurality of cam segments, each cam segment including a different part of the control cam portion,
wherein the plurality of cam segments are rotationally offset by an offset angle in a progressive manner along an axial direction of the cam shaft, so as to generate a wave-like motion of the engaging members along the longitudinal direction,
wherein each cam segment has a circular portion making up a majority of a respective cam segment circumference, each circular portion having a radius allowing a corresponding engaging member to be moved into a fully retracted position, and
wherein a remainder of the respective cam segment circumference is the different part of the control cam having a non-circular configuration, which, upon rotation of each cam segment, pushes the corresponding engaging member from the fully retracted position into a fully extended position.

2. The linear drive device according to claim 1, wherein the engaging members are configured in a linear arrangement that is aligned parallel to the longitudinal direction.

3. The linear drive device according to claim 1, wherein the engaging members are configured in a circular arrangement around the first member.

4. The linear drive device according to claim 1, wherein at least one engaging member is integrally formed with a membrane member, the membrane member being deformable by the control cam portion so that the engaging members are shiftable between the fully retracted and fully engaged positions.

5. The linear drive device according to claim 1, wherein at least one engaging member has an engaging portion that is arranged to contact the first member, and the engaging portion engages the first member in a planar manner.

6. The linear drive device according to claim 5, wherein at least one engaging member has a cam contact portion that is arranged opposite of the engaging portion and arranged to contact the cam contact portion.

7. The linear drive device according to claim 1, wherein at least one engaging member is formed as a rectangular solid member or as a pin-like member.

8. The linear drive device according to claim 1, wherein at least one engaging member is formed as a circular arc shaped solid member.

9. The linear drive device according to claim 1, wherein the second member supports at least one of the cam shaft or the engaging members.

10. The linear drive device according to claim 1, wherein the second member comprises a support member having a plurality of openings, and the engaging members are arranged in the openings so as to be slidable between the fully extended and fully retracted positions.

11. The linear drive device according to claim 1, wherein the cam shaft is configured as a massive shaft and the control cam portion is disposed on an outer circumferential surface of the cam shaft.

12. The linear drive device according to claim 1, wherein the cam shaft is configured as a hollow shaft and the control cam portion is disposed on an inner circumferential surface of the cam shaft.

13. The linear drive device according to claim 1, wherein the cam shaft is configured as an articulated shaft and each cam segment forms an articulated portion of the articulated shaft.

14. A drive arrangement for a wing of an aircraft comprising at least one of a high-lift device or a control surface, and a linear drive device according to claim 1, wherein the linear drive device is configured to drive the at least one of the high-lift device or the control surface between a fully retracted and a fully extended position, wherein the first member is attached to the at least one of the high-lift device or control surface and the second member is attachable to the wing.

15. A wing for an aircraft comprising a drive arrangement according to claim 14.

16. An aircraft comprising a linear drive device according to claim 1.

17. An aircraft comprising a drive arrangement according to claim 14.

18. An aircraft comprising a wing according to claim 15.

\* \* \* \* \*